United States Patent [19]

Maly

[11] Patent Number: 5,678,853
[45] Date of Patent: Oct. 21, 1997

[54] AIRBAG MODULE WITH DEPLOYMENT CHUTE

[75] Inventor: Timothy M. Maly, Plymouth, Mich.

[73] Assignee: Morton International, Inc., Chicago, Ill.

[21] Appl. No.: 673,629

[22] Filed: Jun. 26, 1996

[51] Int. Cl.⁶ ............................................. B60R 21/22
[52] U.S. Cl. ............................ 280/730.2; 280/743.1
[58] Field of Search ..................... 280/730.2, 731, 280/732, 743.1

[56] References Cited

U.S. PATENT DOCUMENTS

| | | | |
|---|---|---|---|
| 5,112,079 | 5/1992 | Haland et al. | 280/730.2 |
| 5,135,255 | 8/1992 | Henseler et al. | 280/743.1 |
| 5,242,192 | 9/1993 | Prescaro et al. | 280/730.1 |
| 5,316,336 | 5/1994 | Taguchi et al. | 280/730.2 |
| 5,324,072 | 6/1994 | Olson et al. | 280/730.2 |
| 5,333,899 | 8/1994 | Witte | 280/730.2 |
| 5,348,342 | 9/1994 | Haland et al. | 280/730.2 |
| 5,348,343 | 9/1994 | Hawthorn | 280/730.1 |
| 5,364,124 | 11/1994 | Donegan et al. | 280/730.1 |
| 5,496,061 | 3/1996 | Brown | 280/730.2 |
| 5,498,030 | 3/1996 | Hill et al. | 280/743.1 |
| 5,499,840 | 3/1996 | Nakano | 280/730.1 |
| 5,533,750 | 7/1996 | Karlow et al. | 280/730.2 |
| 5,542,691 | 8/1996 | Marjanski et al. | 280/730.2 |
| 5,553,887 | 9/1996 | Karlow et al. | 280/730.2 |
| 5,601,332 | 2/1997 | Schultz et al. | 280/730.2 |
| 5,630,615 | 5/1997 | Miesik | 280/730.2 |

FOREIGN PATENT DOCUMENTS 5-338514  12/1993  Japan .

*Primary Examiner*—Kenneth R. Rice
*Attorney, Agent, or Firm*—George W. Rauchfuss, Jr.; Gerald K. White

[57] ABSTRACT

An airbag module is installed upon a structural member, such as a seat frame, on a motor vehicle. The structural member is enclosed by padding and covered with an upholstery cover material. One or more portions of the cover material extend inwardly of the padding and enclose the module. The outer portions of the cover material are joined by a frangible seam which forms an airbag opening in a preselected location. Upon inflation, the expanding airbag is guided to the opening by a trough formed by the cover material portions.

12 Claims, 2 Drawing Sheets

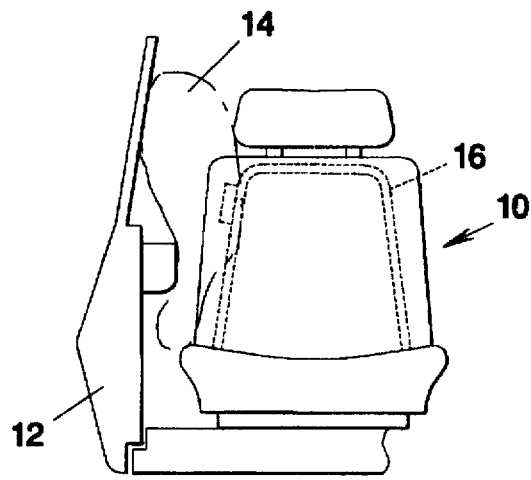
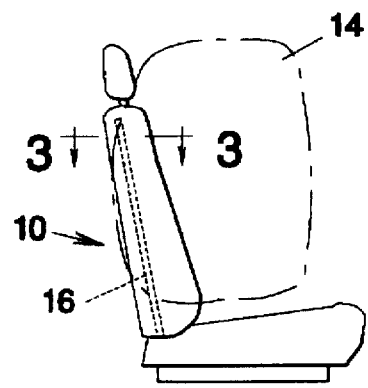
FIG. 1  FIG. 2
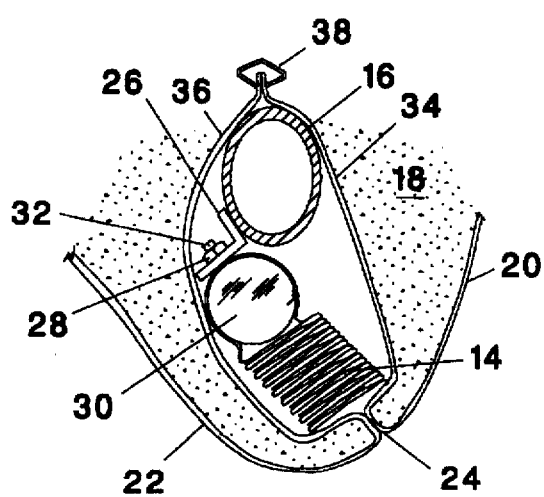
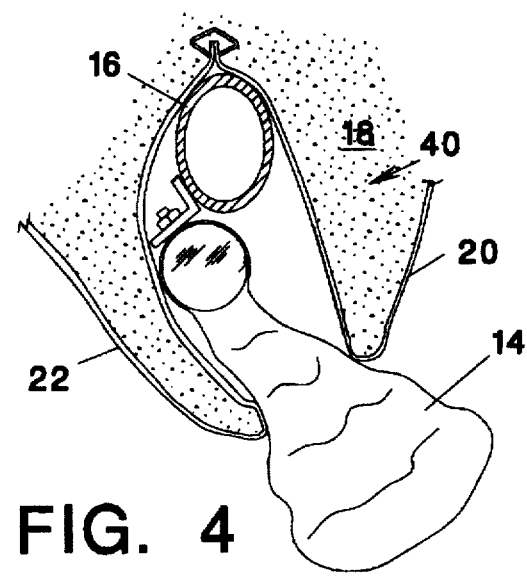
FIG. 3  FIG. 4

AIRBAG MODULE WITH DEPLOYMENT CHUTE

TECHNICAL FIELD

This invention relates to an airbag module for attachment to a vehicle. More specifically, it relates to such a module which may be enclosed within the upholstery of a vehicle seat to employ the upholstery cover material as a guide chute for the expanding airbag.

BACKGROUND ART

Conventional airbag modules employ a rigid housing which is attached to a vehicle, for example, within the steering wheel or behind the passenger-side instrument panel. The housing contains an inflator and a folded airbag. It is now becoming apparent that it would be desirable to employ airbags at other locations within the vehicle. For example, side-mounted airbags would be useful in protecting driver and passengers in side impacts. It has been suggested that side impact airbags could be mounted on the internal frame of a seat and exit through a frangible seam in the seat cover material. An example of such an airbag installation will be found in U.S. Pat. No. 5,498,030 of Hill et al. In the disclosure of that patent, the inflator and airbag are contained within a pouch. Upon airbag inflation, the pouch forms a chute which guides the airbag to a frangible seam portion of the seat cover material which bursts to permit airbag deployment.

It is critical for the safety of the occupant that the airbag deploy in the proper location. If, for example, an airbag is designed to protect an individual's head and neck from injury, the position of airbag deployment is crucial. In the embodiment described in the Hill et al. patent, however, there is no provision for ensuring that the opening of the deployment chute will remain aligned with the desired portion of the upholstery cover material seam. Misalignments such as might occur during a collision or even after years of normal use could result in improper deployment. Accordingly, it is a primary object of the present invention to provide an internally mounted airbag module having a deployment chute outlet fixed in relationship to the upholstery cover material. Other objects, features, and advantages will become apparent from the following description and appended claims.

DISCLOSURE OF INVENTION

The invention comprises an inflator and folded airbag which are mounted on a structural member within a portion of a vehicle which is also padded and covered with an upholstery cover material. In the specifically disclosed embodiment, the particular structural member is the framework of a seat. However, the invention is not so limited. The cover material is formed into a pouch which surrounds the inflator and airbag and is closed at a frangible portion of the normal cover seam. Upon inflation of the airbag, this forms a chute having an exit opening which is in a fixed location relative to the upholstery, such as the seat periphery.

BRIEF DESCRIPTION OF DRAWINGS

FIG. 1 is a front view of a motor vehicle seat embodying the present invention;

FIG. 2 is a left side view of the seat of FIG. 1;

FIG. 3 is an enlarged partial cross-section taken substantially along the line 3—3 of FIG. 2;

FIG. 4 is a view similar to FIG. 3 illustrating airbag deployment;

BEST MODE FOR CARRYING OUT THE INVENTION

Figure 5:
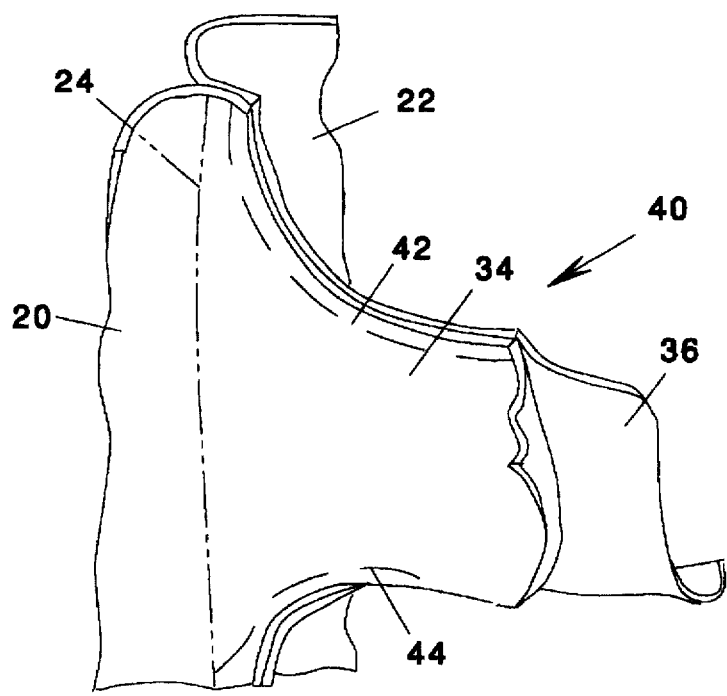
FIG. 5 is an enlarged detail illustrating deployment chute construction.

With particular reference to FIGS. 1 and 2, there is illustrated a motor vehicle seat 10 mounted within a vehicle adjacent a door 12. It is desired to deploy an airbag 14 from the seat into a position between the seat and door to protect the occupant's upper torso and head. The seat includes an internal tubular frame 16.

There is illustrated in FIG. 3 the airbag module of this invention incorporated within the structure of the seat 10. This structure includes padding 18 such as a resilient foam material enclosed in an upholstery cover material. In the illustrated version the cover material may be, for example, of cloth, vinyl, or leather and includes a from panel 20 and a side panel 22 joined at a seam 24. The seam 24 which is illustrated in FIG. 3 may be a frangible portion of a seam which extends around the periphery of the seatback.

Secured to the seat frame 16 by means of a bracket 26 and nut 28 is a cylindrical inflator 30 having a threaded mounting stud 32. The inflator 30 is conventional and, upon actuation, generates a volume of gas to fill the normally folded airbag 14.

The significant feature of this invention is that the airbag module comprising the inflator 30 and the airbag 14 is enclosed within a pouch formed from an internally extending flap 34 of the front panel 20 cover material and a similar flap 36 of the side panel 22 cover material. These flaps overlie the airbag module as well as a portion of the frame 16 and are connected together by any suitable means such as hog rings 38. (It will be understood that it is not necessary for the pouch to enclose a portion of the framework, it being sufficient if it encloses merely the inflator and the folded airbag.) When the inflator is actuated as by a collision, it immediately forces gas into the mouth of the airbag 14. The airbag expands, bursting the frangible seam 24 so as to exit through the resulting opening as illustrated in FIG. 4. The opening pouch forms a chute 40 guiding the airbag through the opening. Because this chute is formed from the seat cover material, it will remain fixed in position relative to the seat regardless of outside forces acting upon it.

It will be understood that the shape and dimensions of the pouch and chute may vary depending upon the geometry of the seat or other vehicle member within which the airbag is stored. FIG. 5 illustrates in greater detail a portion of the front panel 20 and the side panel 22 joined together at a frangible seam portion 24 with unitary internally extending flaps 34, 36 from the front and side panels, respectively. The upper edges of the flaps are joined by a non-frangible seam 42 and their lower edges by a non-frangible seam 44.

Figure 6:
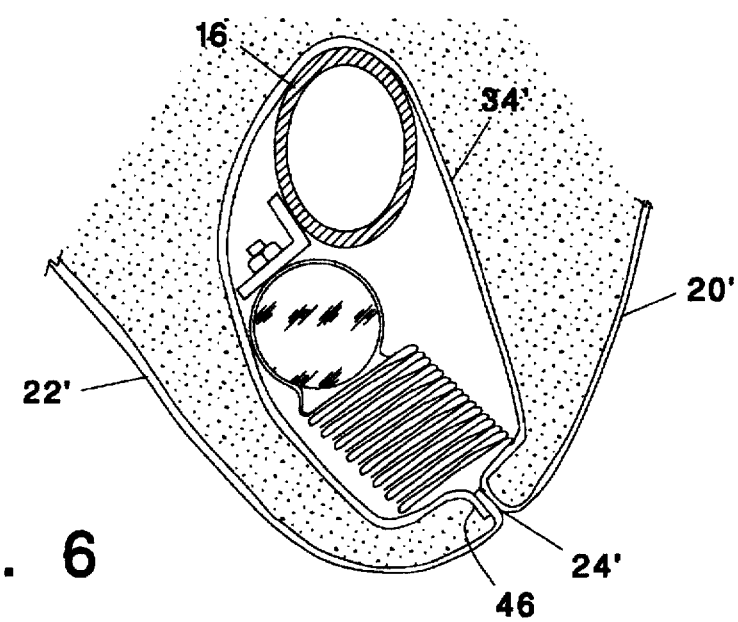
FIG. 6 is a view similar to FIG. 3 illustrating an alternative construction.

It will be understood that the pouch enclosing the airbag module need not necessarily be formed by separate flaps from each cover material portion. For example, there is illustrated in FIG. 6 a construction wherein the front panel 20' includes an elongated flap 34' which extends completely around the airbag module and frame 16 to terminate at an edge of the side panel 22'. The interconnection 46 between the flap 34' and side panel 22' would be non-frangible and designed to withstand the airbag deployment forces, while permitting the frangible seam 24' to open in the normal manner.

By means of this invention an airbag module may be concealed within the structure of a vehicle such as a vehicle seat. In this position it will be well-padded so as not to be apparent to a seat occupant. Upon actuation, the airbag's deployment is absolutely controlled by a chute formed by the cover material of the seat itself. In this manner, the airbag is caused to deploy from its pre-selected position on the seat regardless of any forces that might be exerted upon the vehicle structure.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In a motor vehicle seat having an internal frame, padding surrounding said frame, and an external upholstery cover material surrounding and enclosing said padding by a frangible seam located at a preferred airbag deployment location, the improvement which comprises:

a gas generating inflator mounted to said frame;

an inflatable airbag mounted to said inflator to receive inflating gas therefrom; and a portion of said cover material extending inwardly from said frangible seam and surrounding said inflator and airbag, thereby forming a guide chute to direct the airbag, upon inflation, to and through the parting frangible seam at said preferred deployment location.

2. The improvement of claim 1 wherein said cover material portion comprises complementary first and second portions, each extending inwardly from said frangible seam and conjoined to surround said inflator and airbag.

3. The improvement of claim 1 wherein said cover material portion extends inwardly from said frangible seam, surrounds said inflator and airbag, and terminates at said frangible seam.

4. The improvement of claim 2 wherein said cover material portion additionally surrounds a portion of said frame.

5. The improvement of claim 3 wherein said cover material portion additionally surrounds a portion of said frame.

6. In a motor vehicle having a structural member, padding surrounding said member, and an external upholstery cover material surrounding and enclosing said padding by a frangible seam located at a preferred airbag deployment location, the improvement which comprises:

a gas generating inflator mounted to said member;

an inflatable airbag mounted to said inflator to receive inflating gas therefrom; and a portion of said cover material extending inwardly from said frangible seam and surrounding said inflator and airbag, thereby forming a guide chute to direct the airbag, upon inflation, to and through the parting frangible seam at said preferred deployment location.

7. The improvement of claim 6 wherein said cover material portion comprises complementary first and second portions, each extending inwardly from said frangible seam and conjoined to surround said inflator and airbag.

8. The improvement of claim 6 wherein said cover material portion extends inwardly from said frangible seam, surrounds said inflator and airbag, and terminates at said frangible seam.

9. The improvement of claim 7 wherein said cover material portion additionally surrounds a portion of said structural member.

10. The improvement of claim 8 wherein said cover material portion additionally surrounds a portion of said structural member.

11. In a motor vehicle seat having an internal frame, padding surrounding said frame, and a plurality of interconnected panels of upholstery cover material surrounding and enclosing said padding, the improvement which comprises:

at least one of said panels having a unitary flap extending inwardly within said padding and forming a guide chute adapted to direct an expanding airbag from the interior of said seat through a frangible seam portion interconnecting said panel to an adjoining panel.

12. The improvement of claim 11 wherein each of two interconnected panels has a unitary flap extending inwardly within said padding, said flaps being joined internally of said seat to form said guide chute.

* * * * *